(12) United States Patent
Dambaugh et al.

(10) Patent No.: US 7,708,468 B2
(45) Date of Patent: May 4, 2010

(54) BEARING ARRANGEMENT FOR ABSORBING AXIAL LOADS

(75) Inventors: Gabriel Dambaugh, Fort Mill, SC (US); Jim Ingerslew, Sugarland, TX (US)

(73) Assignee: Schaeffler KG, Herzogenaurach (DE)

( * ) Notice: Subject to any disclaimer, the term of this patent is extended or adjusted under 35 U.S.C. 154(b) by 826 days.

(21) Appl. No.: 10/571,079

(22) PCT Filed: Aug. 19, 2004

(86) PCT No.: PCT/EP2004/009290

§ 371 (c)(1), (2), (4) Date: Nov. 2, 2006

(87) PCT Pub. No.: WO2005/028888

PCT Pub. Date: Mar. 31, 2005

(65) Prior Publication Data

US 2007/0071384 A1  Mar. 29, 2007

(51) Int. Cl.
F16C 19/54 (2006.01)
F16C 41/02 (2006.01)

(52) U.S. Cl. .................................. 384/619; 384/622

(58) Field of Classification Search ................ 384/618, 384/619, 620, 622, 903
See application file for complete search history.

(56) References Cited

U.S. PATENT DOCUMENTS

| 2,374,820 | A |   | 5/1945 | Kaye et al. |
| 3,652,140 | A |   | 3/1972 | Bruno et al. |
| 4,545,627 | A | * | 10/1985 | Nakamura et al. ........... 384/585 |
| 5,690,434 | A |   | 11/1997 | Beshoory et al. |
| 6,280,095 | B1 | * | 8/2001 | Furukoshi et al. ........... 384/489 |
| 2002/0160842 | A1 | * | 10/2002 | Ramey ........................ 464/170 |

FOREIGN PATENT DOCUMENTS

| DE | 1 170 717 | 3/1964 |
| DE | 1 188 381 | 3/1965 |
| DE | 2 114 696 | 10/1972 |
| DE | 2 114 698 | 10/1972 |
| DE | 71 40 687 | 5/1973 |
| DE | 27 18 861 | 2/1978 |
| DE | 37 28 828 | 8/1988 |
| FR | 2 043 893 | 5/1969 |
| FR | 2 393 186 | 7/1977 |
| GB | 777620 | 6/1957 |
| WO | WO 00/46478 | 8/2000 |

* cited by examiner

*Primary Examiner*—William C Joyce
(74) *Attorney, Agent, or Firm*—Lucas & Mercanti, LLP

(57) ABSTRACT

A bearing arrangement for absorbing axial loads, which has a plurality of axial roller bearings arranged one behind the other and each having a housing plate, a shaft plate, and rolling body sets arranged between the runner plates. In each case, the shaft plates and the housing plates are supported axially by spacer rings arranged between them. The housing plates and the shaft plates have a constant axial thickness over their entire radial extent in the region of the rolling body sets, and at least one of the shaft plates has an annular clearance at its inner circumference which is inwardly open in the radial direction.

4 Claims, 6 Drawing Sheets

BEARING ARRANGEMENT FOR ABSORBING AXIAL LOADS

FIELD OF THE INVENTION

The invention relates to a bearing arrangement for absorbing axial loads, comprising a plurality of roller bearings arranged one behind the other and each having a housing plate, a shaft plate and rolling body sets arranged between these runner plates, the shaft plates and the housing plates being supported axially by means of spacer rings arranged between them in each case.

BACKGROUND OF THE INVENTION

To increase the load capacity of axial bearings, a plurality of axial bearings are installed one behind the other positionally. Measures are necessary here to distribute the overall load of the bearing arrangement in as uniform a manner as possible between the individual axial bearings.

One known design for a bearing arrangement for absorbing axial loads is designated as a "tandem bearing". A plurality of, usually two to four, axial bearings are connected to form a unit in which the plates which sit on the shaft (shaft plates) and the plates which sit in the housing (housing plates) are supported by means of spacer rings arranged between them in each case. A uniform loading of all the sets of rolling bodies is obtained by the runner plates and the cages all being embodied differently than one another so as to give uniform deflection.

It is also known for the runner plates and the cages to be embodied the same, and for the runner plates to be supported axially by means of differently embodied resilient elements.

It is conventional, within a bearing arrangement for absorbing axial loads, to provide the shaft runner plates and the housing runner plates with spring constants that are adapted to one another. This is achieved by virtue of the fact that the runner plates have a non-rectangular cross-section so that they can deflect under axial load. A bearing arrangement of this type is disclosed by German utility model application DE 71 40 687. A bearing arrangement of this type is, however, very complex to produce on account of the non-rectangular design of the runner plates.

According to DE 21 14 698, another possibility, given a plurality of axial roller bearings arranged one behind the other axially, for preventing overloading of the rolling bodies as a result of their single-sided loading is that the housing plates, at their cylindrical circumferential face, and the shaft plate, in its bore, have sufficient clearances that only annular seat faces bear directly against both the shaft seat faces and the housing, the axial height of which is significantly smaller than the height of the runner disks in this region. Disadvantages of said bearing arrangement are both that the runner plates have a non-rectangular cross section and that the abovedescribed clearances are necessary, each of which contribute to the bearing arrangement being more expensive.

The well-known problem in roller bearing technology of edge bearing, in which the rolling bodies only transmit loads over part of their length, accordingly plays a significant role even where a plurality of roller bearings are arranged one behind the other. This is because if this problem is not solved, it leads to overloading both of the rolling bodies and of the associated points in the raceways, which can lead to early failure of the overall roller bearing arrangement. Where a plurality of bearings are arranged one behind the other axially, the abovedescribed attempts to solve said problem are however too complex.

SUMMARY OF THE INVENTION

It is therefore the object of the invention both to significantly simplify the construction and production of a bearing arrangement for absorbing axial loads and to increase the service life and operational reliability of the bearing arrangement by uniformly distributing the load to the individual axial roller bearings.

According to the invention, this object is achieved in that a bearing arrangement for absorbing axial loads, comprises a plurality of axial roller bearings arranged one behind the other; housing plates; and a shaft plates, the axial roller bearings forming rolling body sets arranged between the housing plates and the shaft plates, the shaft plates and the housing plates being supported axially by means of spacer rings arranged between each of the shaft plates and each of the housing rings, wherein the housing plates and the shaft plates have a constant axial thickness over their entire radial extent in the region of the rolling body sets, and at least one of the shaft plates is provided at its inner circumference with an annular clearance which is inwardly open in the radial direction.

The advantage of said clearance is that the shaft plates have a variable stiffness as seen in cross-section, so that the force line path coming from the load is diverted from one of the runner plates into one of the rolling body sets and directly into the rolling bodies. The rolling bodies thus no longer transmit forces over part of their axial length but over almost their entire axial length. In this way, overload peaks in rolling bodies and raceways are avoided, which has a positive effect on the operation and service life of the bearing arrangement.

A further advantage of the inwardly open clearance is that, by decreasing the stiffness of the shaft plates, a resilient effect is obtained which brings about an increased resistance to failure under impact loading of the bearing arrangement. Should heavy impact loading occur, the shaft plate deforms in the axial direction and thus has a composating effect on the entire bearing arrangement.

Production of the bearing is simplified, and hence made more cost-effective, in particular by the rectangular design of the runner plates. Complex cutting machining processes for producing conically tapering runner plates are therefore not necessary. In contrast to these cutting machining processes which are necessary in the prior art, the introduction of the inwardly open clearance in the shaft plate plays only a secondary role in terms of cost.

The shape and spatial extent of the clearance arranged in the shaft plate is of secondary importance. Said clearance must be re-designed individually for each bearing arrangement as a function of the prevailing size loading ratios.

Advantageous developments of the invention are described in the subclaims.

Accordingly, the lower shaft plate is to be provided with an annular clearance, while the upper shaft plate should have this clearance.

The arrangement of the clearance in the lower shaft plate is the standard procedure if the force acting on the bearing arrangement is to be in a downward direction, that is to say in the direction of gravity. This is the case for example in deep-drilling appliances when the force in the direction of the center of the earth comes from a motor which is to move a drill in the direction of the center of the earth. If, in contrast, tandem bearings of this type are used in transmissions for screw-type extrusion machines in the rubber or plastics industries, the force applied to the bearing acts in the horizontal direction. The lower shaft plate is to be regarded in this case as that shaft plate which is situated furthest from the point at which the force acts.

Staying with the example of the deep-drilling appliance, the upper shaft plate is advantageously always equipped with the annular clearance when an upwardly acting counterforce is triggered against the downwardly acting force of the motor. This is for example the case when the drill, which is driven by the motor, must penetrate through very hard rock layers.

A further significant feature of the bearing arrangement is that the bearing ring has a securing ring is provided at least in one of the clearances. Said securing ring prevents excessive deformation or even fracture of the shaft plate as would otherwise be caused by an excessive force acting on it. The system is thus significantly stiffer since the securing ring can absorb an additional part of the active force by means of deformation, without damage occurring to the shaft plate. It should be noted, as is the case with the annular clearance, that the securing ring must be designed individually for each application. This relates for example to the material used which, according to claim 5, should be elastic. However, the size and the cross-sectional shape of the securing ring also have an effect on the stiffness of the shaft plate.

Finally, a last feature provides that the securing ring should have a slot. This is necessary primarily for facilitating assembly.

The invention is described in more detail on the basis of the following exemplary embodiment.

DETAILED DESCRIPTION OF THE DRAWINGS

Figure 1:
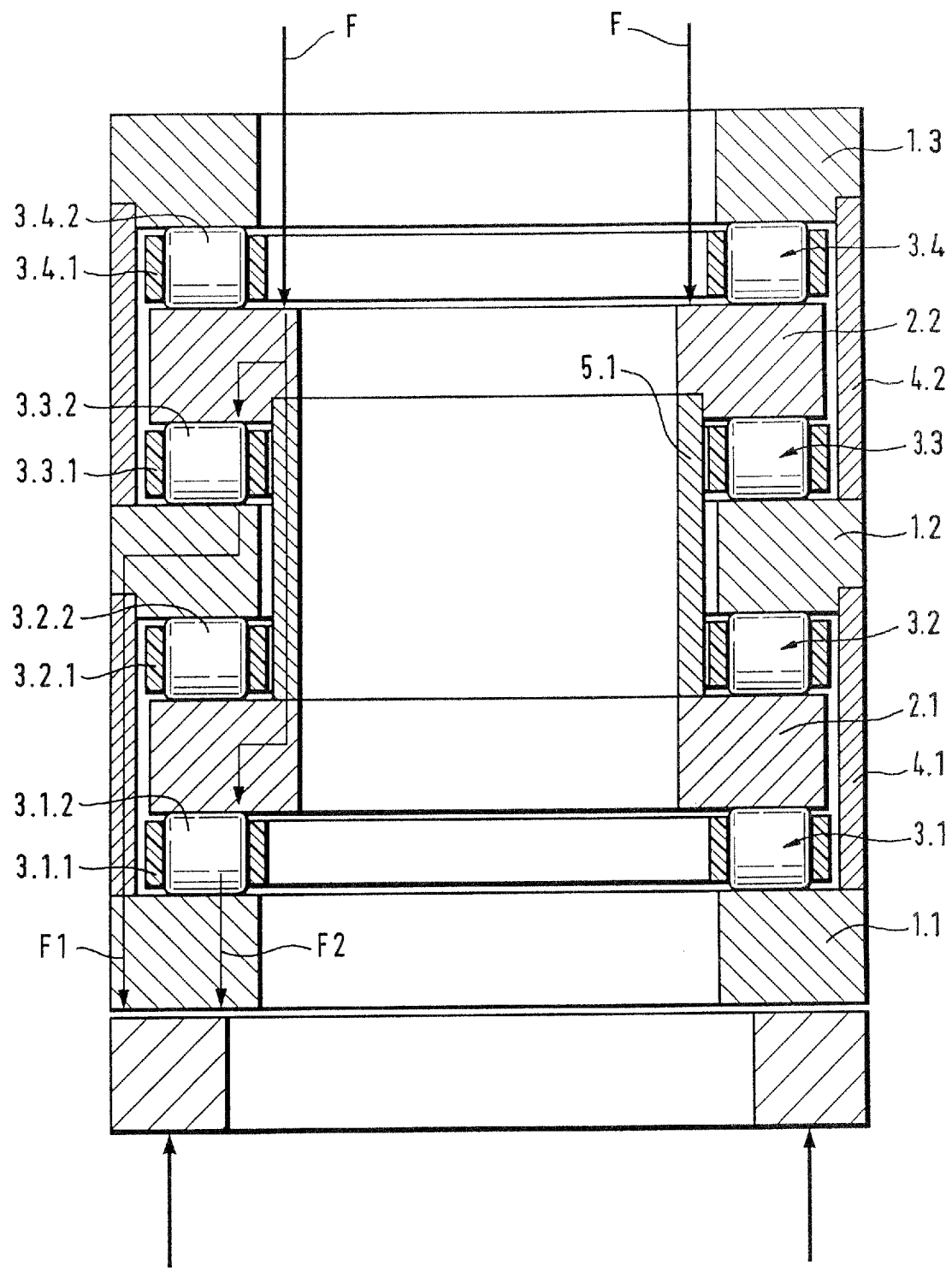
FIG. 1 shows a longitudinal section through an axial bearing arrangement as described in the previous prior art.

The bearing arrangement illustrated in FIG. 1 for absorbing axial loads comprises four axial roller bearings arranged one behind the other. These each comprise a housing plate 1.1, 1.2, 1.3, a shaft plate 2.1, 2.2 and rolling body sets 3.1, 3.2, 3.3, 3.4 arranged between these runner plates. Said rolling body sets are composed of cylindrical rolling bodies 3.1.2, 3.2.2, 3.3.2, 3.4.2 which are guided in cages 3.1.1, 3.2.1, 3.3.1, 3.4.1. The housing plates 1.1, 1.2, 1.3 are each supported axially by means of spacer rings 4.1, 4.2, and the shaft plates 2.1, 2.2 are supported axially by means of the spacer ring 5.1.

If, as can also be seen in FIG. 1, a force (denoted F) is introduced into the upper shaft plate 2.2, the force flow is as follows:

The force F is divided into two partial forces F1, F2, a force flow F1 to the housing plate 1.1 passing via the upper shaft plate 2.2, the rolling body set 3.3, the housing plate 1.2 and the spacer ring 4.1. The second associated force flow F2 likewise proceeds from the upper shaft plate 2.2, continues via the spacer ring 5.1 and reaches the lower shaft plate 2.1 before reaching, in turn, the housing plate 1.1 via the rolling body set 3.1.

Figure 4:
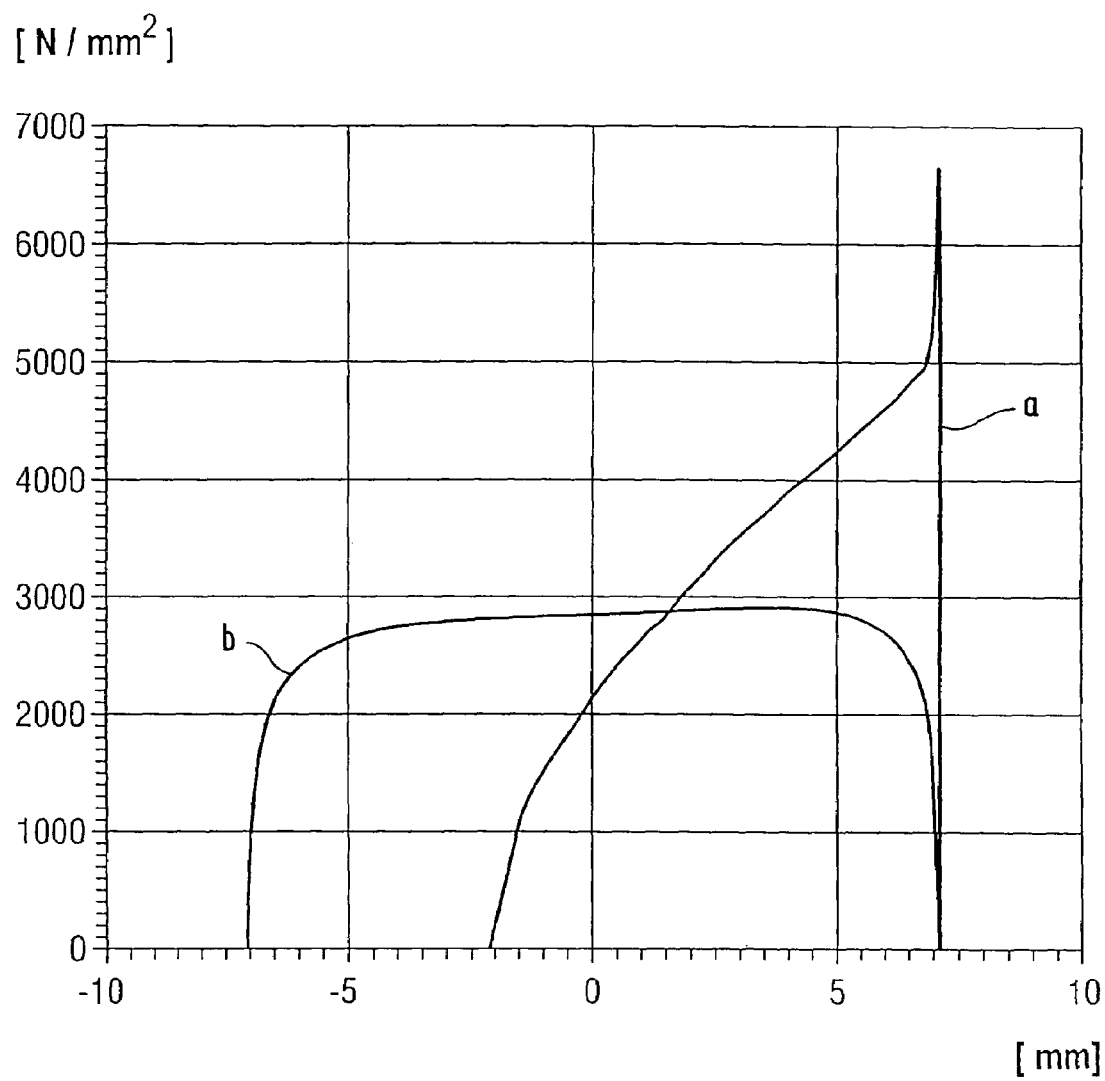
FIG. 4 shows the load distribution over a rolling body whose shaft plate is respectively provided with and without a clearance according to the invention.

As can also be seen from FIG. 1, production-related inaccuracies can lead to problems occurring, in the force flow of the partial force F2, in the transition between the shaft plate 2.1 and the rolling body set 3.1. That is to say the axial load F2 proceeding from the shaft plate 2.1 is only absorbed by the rolling bodies 3.1.2 of the rolling body set 3.1 over part of their axial length. In other words, overloading occurs in the inner region of the rolling bodies 3.1.2 which adversely affects the overall bearing arrangement. An unfavorable profile such as this of the surface pressure over the axial length of the rolling bodies 3.1.2 is illustrated in FIG. 4. It can be seen that according to the curve a, load peaks of up to over 6000 N/mm$^2$ can occur in the inwardly situated region of the rolling bodies 3.1.2, while the radially outwardly situated end of the rolling bodies 3.1.2 is pratically unloaded. The invention deals with this problem which, in roller bearing technology, is also known as edge bearing.

Figure 2:
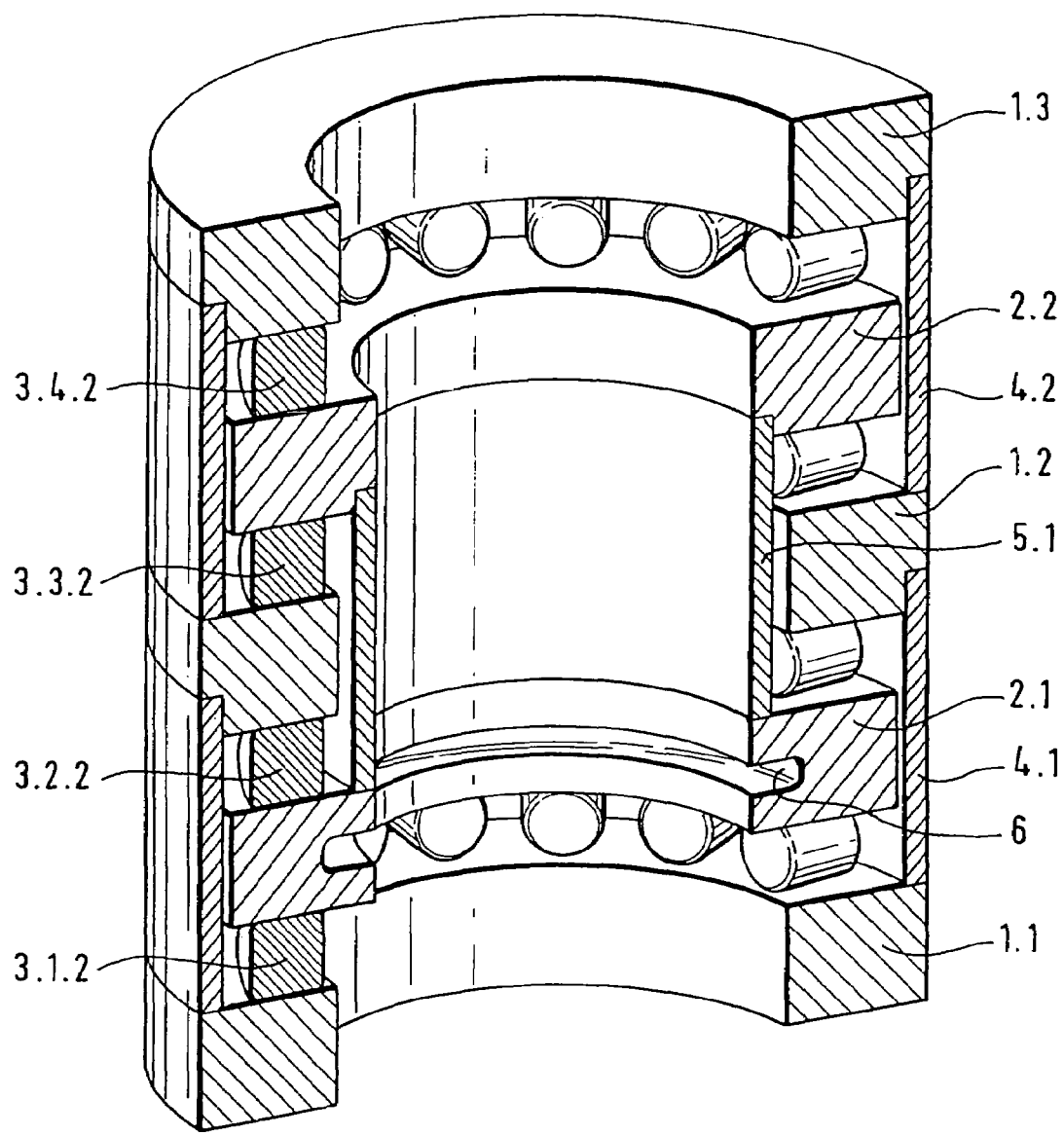
FIG. 2 shows a longitudinal section through an axial bearing arrangement having a clearance according to the invention.
Figure 3:
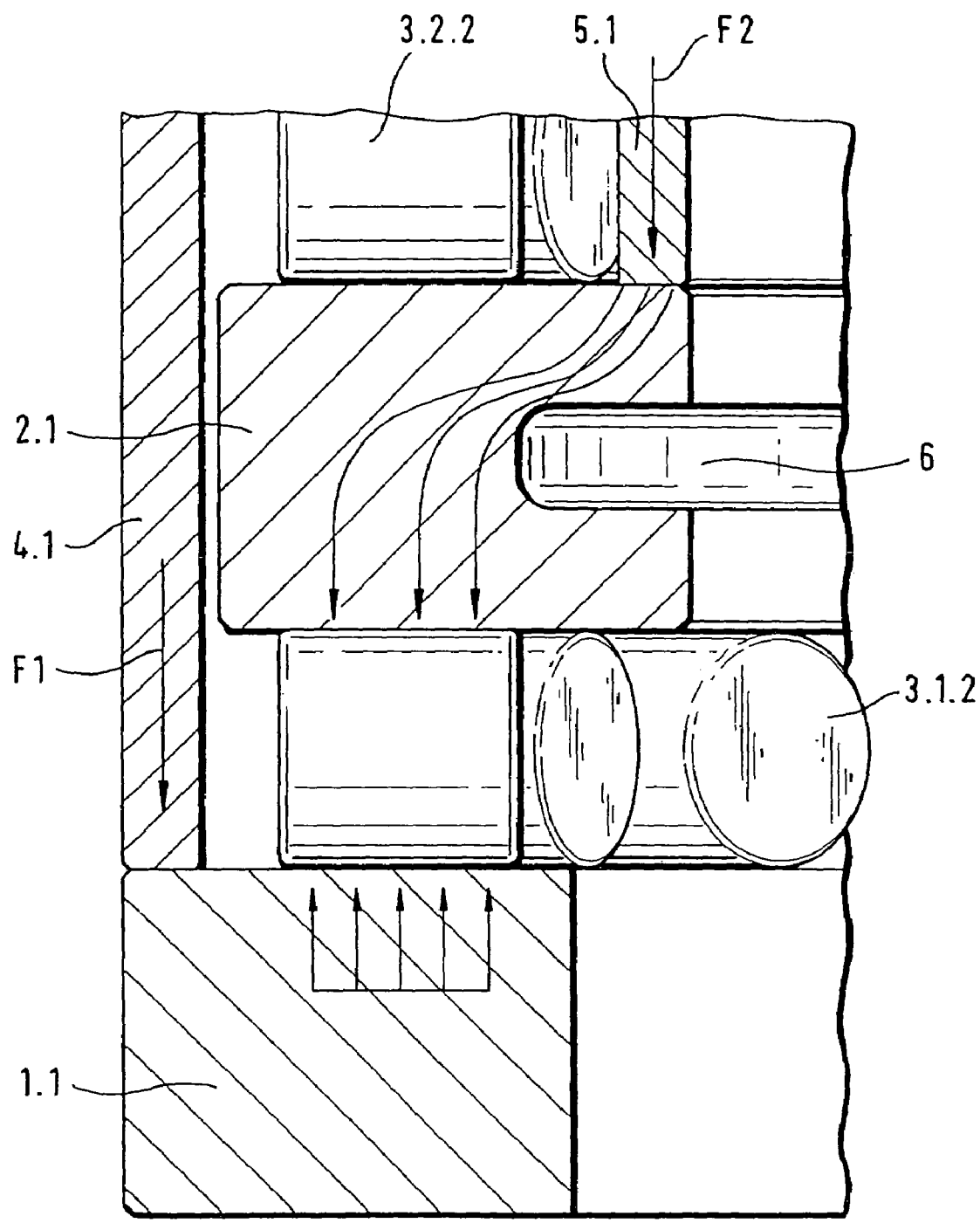
FIG. 3 shows the profile of the force lines through a shaft plate which is provided, according to the invention, with a clearance.

According to the exemplary embodiment in FIG. 2, the lower shaft plate 2.1 is provided with an annular clearance 6 which is inwardly open in the radial direction. As can be seen from FIG. 3, the partial force F2 which is transmitted from the spacer ring 5.1 to the lower shaft plate 2.1 is diverted by means of the clearance 6 in such a way that the rolling bodies 3.1.2 of the rolling body set 3.1 are acted upon by the force F2 in a uniform manner over their entire length. In this way, a force profile results over the axial extent of the rolling bodies 3.1.2 corresponding to curve b shown in FIG. 4. It can be seen from curve b in FIG. 4 that an approximately constant surface pressure of approximately 3000 N/mm$^2$ is given over the entire axial extent of the one or more cylindrical rolling bodies 3.1.2. The principal stresses in the region of the inwardly open clearances are compressive stresses. This offers more security against fatigue in comparison with tensile loads.

Figure 5:
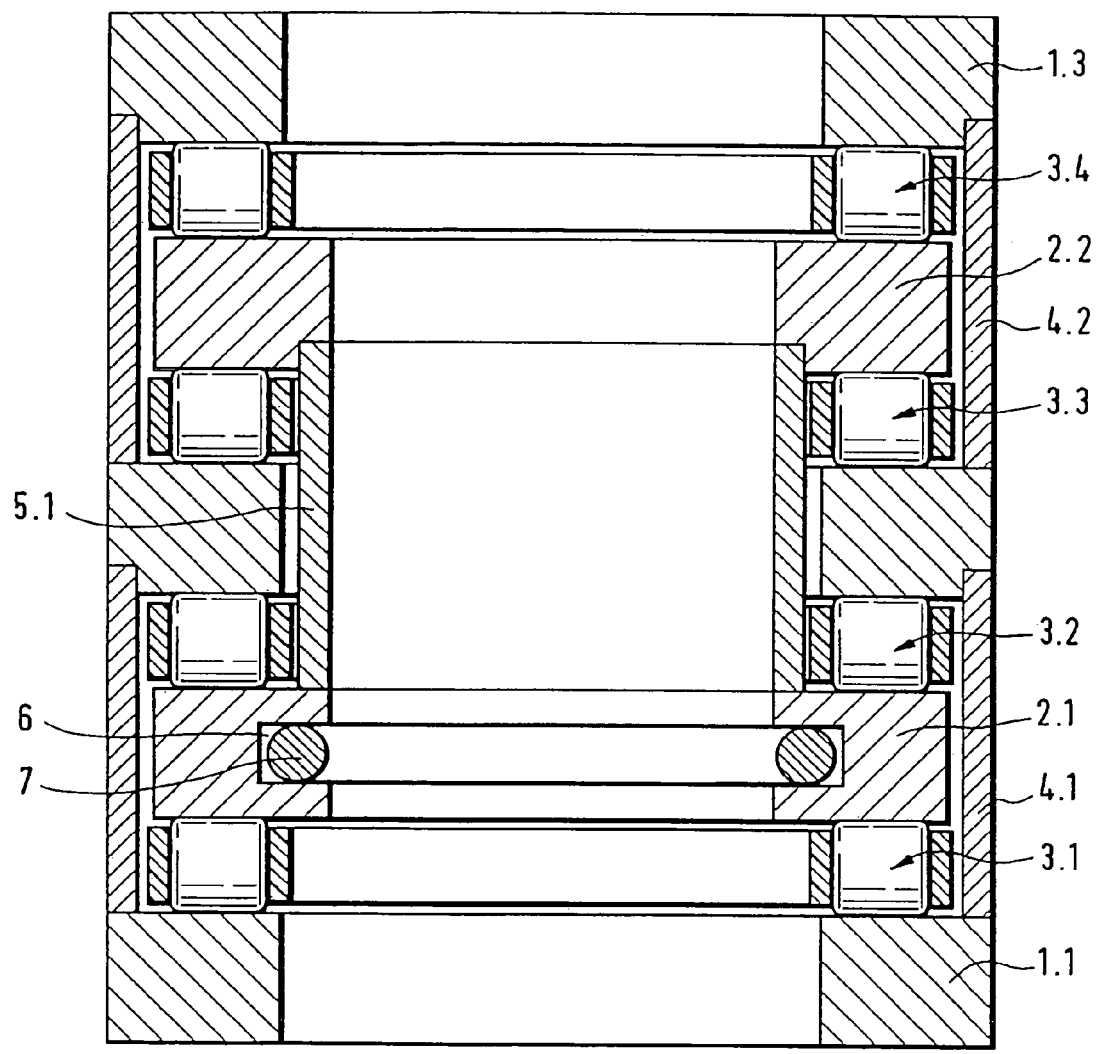
FIG. 5 shows a longitudinal section through a bearing arrangement according to the invention having a clearance and securing ring.
Figure 6:
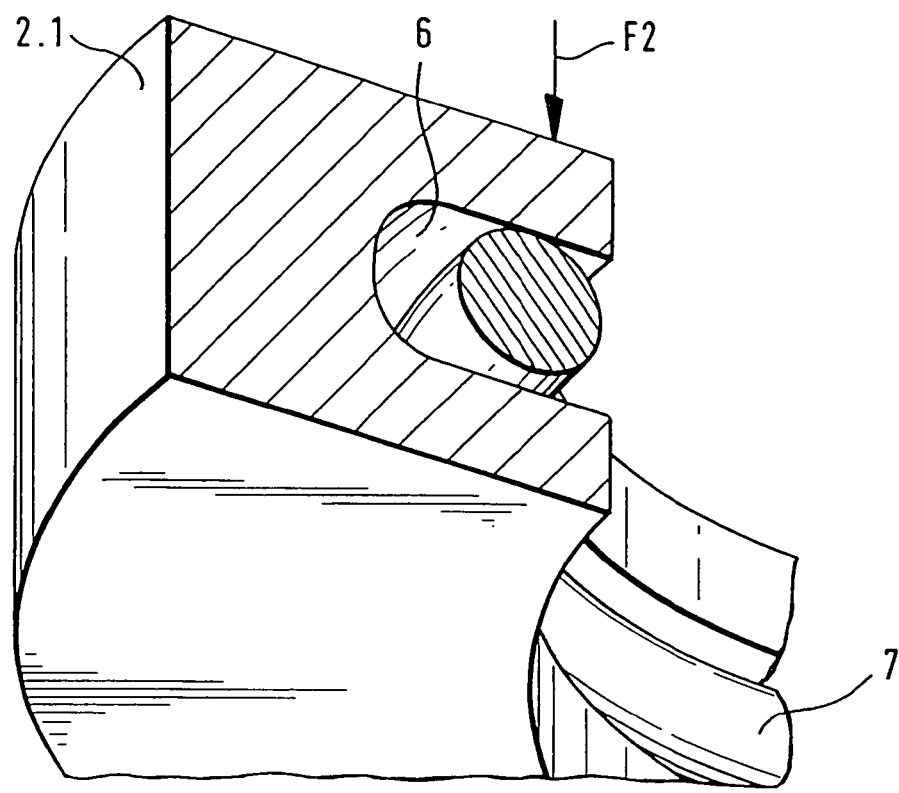
FIG. 6 shows an enlarged illustration of the section indicated in FIG. 5
Figure 7:
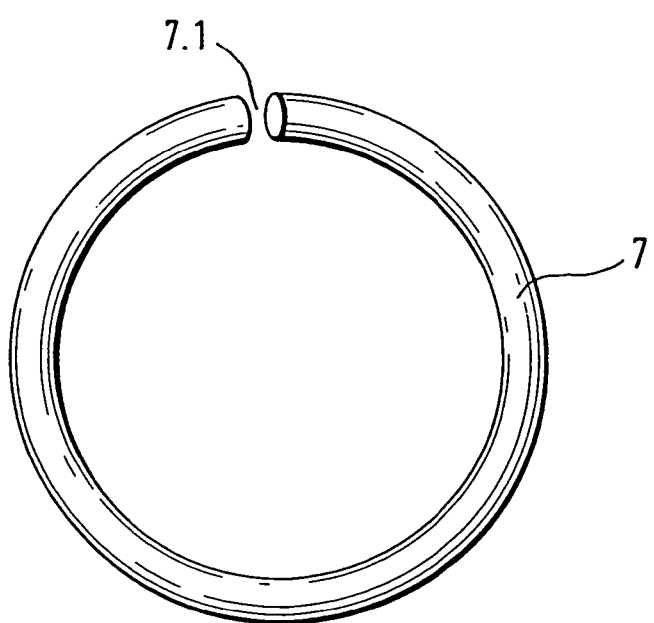
FIG. 7 shows a plan view of a slotted securing ring.

Finally, FIGS. 5, 6 and 7 show a bearing arrangement according to the invention for absorbing axial loads, in which a securing ring 7 provided with a slot 7.1 is inserted in the clearance 6. It can be seen that the stiffness of the shaft plate 2.1 is increased by means of said securing ring 7, since a compression of the shaft plate 2.1 in the axial direction is hampered. Said compression of the shaft plate 2.1 is only possible if both the stiffness of the shaft plate 2.1 is overcome and, in addition, the securing ring 7 deforms in the axial direction, that is to say is changed in shape.

LIST OF REFERENCE DESIGNATIONS

1.1 Housing plate
1.2 Housing plate
1.3 Housing plate
2.1 Shaft plate
2.2 Shaft plate
3.1 Rolling body set
3.2 Rolling body set
3.3 Rolling body set
3.4 Rolling body set
3.1.1 Cage
3.2.1 Cage
3.3.1 Cage 3.4.1 Cage
3.1.2 Rolling body
3.2.2 Rolling body
3.3.2 Rolling body
3.4.2 Rolling body
4.1 Spacer ring
4.2 Spacer ring
5.1 Spacer ring
6 Clearance
7 Securing ring
7.1 Slot

The invention claimed is:

1. A bearing arrangement for absorbing axial loads, comprising:
 a plurality of axial roller bearings arranged one behind the other; housing plates; and shaft plates, the axial roller bearings forming rolling body sets arranged between the housing plates and the shaft plates, the shaft plates and the housing plates being supported axially by means of spacer rings arranged between each of the shaft plates and each of the housing plates,
 wherein the housing plates and the shaft plates have a constant axial thickness over their entire radial extent in a region of the rolling body sets, and at least one of the shaft plates has an annular clearance at an inner circumference which is inwardly open in a radial direction, the annular clearance having a predetermined size such that an axial force transmitted from the spacer ring to the shaft plate with the annular clearance is diverted by means of the clearance in such a way that the associated roller bearings are acted upon by a uniform force over substantially the entire length of the roller bearings.

2. The bearing arrangement of claim 1, wherein a securing ring is fitted in the clearance.

3. The bearing arrangement of claim 2, wherein the securing ring is composed of an elastic material.

4. The bearing arrangement of claim 2, wherein the securing ring has a slot.

* * * * *